US011247565B2

(12) United States Patent
Banno et al.

(10) Patent No.: US 11,247,565 B2
(45) Date of Patent: Feb. 15, 2022

(54) VIRTUAL IMAGE DISPLAY DEVICE

(71) Applicant: DENSO CORPORATION, Kariya (JP)

(72) Inventors: Hiroto Banno, Kariya (JP); Takeshi Hato, Kariya (JP); Yuichiro Hayakawa, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 0 days.

(21) Appl. No.: 16/871,949

(22) Filed: May 11, 2020

(65) Prior Publication Data

US 2020/0269696 A1 Aug. 27, 2020

Related U.S. Application Data

(63) Continuation of application No. PCT/JP2018/036675, filed on Oct. 1, 2018.

(30) Foreign Application Priority Data

Nov. 28, 2017 (JP) .............................. JP2017-227850

(51) Int. Cl.
*B60K 35/00* (2006.01)
*G02B 27/01* (2006.01)
(Continued)

(52) U.S. Cl.
CPC .......... *B60K 35/00* (2013.01); *G02B 27/0101* (2013.01); *G09G 5/36* (2013.01);
(Continued)

(58) Field of Classification Search
CPC .... G02B 27/101; G02B 27/646; G09G 3/001; G09G 5/36; G09G 5/377; G09G 2340/12;
(Continued)

(56) References Cited

U.S. PATENT DOCUMENTS

2015/0281582 A1\* 10/2015 Sakurai .............. H04N 5/23287
348/208.2
2016/0167647 A1 6/2016 Yamada et al.
(Continued)

FOREIGN PATENT DOCUMENTS

| JP | 2015132352 A | 7/2015 |
| JP | 2015202842 A | 11/2015 |
| WO | WO-2019106942 A1 | 6/2019 |

*Primary Examiner* — Christopher E Leiby
(74) *Attorney, Agent, or Firm* — Harness, Dickey & Pierce, P.L.C.

(57) ABSTRACT

A virtual image display device that displays a virtual image by projecting a display light image to a projection area of a vehicle, includes: a low-frequency information acquisition portion that acquires attitude change information of the vehicle at a low-frequency band; a high-frequency information acquisition portion that acquires attitude change information of the vehicle at a high-frequency band; an image renderer that renders image data of the display light image corrected to reduce misalignment attributed to the attitude change at the low-frequency band; a projection optical unit that includes a display surface to display an original image based on the image data, and projects light of the original image as the display light image; and a display controller that displaces the original image to reduce the misalignment of the virtual image attributed to the attitude change at the high-frequency band.

12 Claims, 7 Drawing Sheets

(51) Int. Cl.
*G09G 5/36* (2006.01)
*H04N 5/74* (2006.01)

(52) U.S. Cl.
CPC ......... *H04N 5/74* (2013.01); *B60K 2370/155* (2019.05); *B60K 2370/1529* (2019.05); *B60K 2370/177* (2019.05); *B60Y 2400/92* (2013.01); *G09G 2380/10* (2013.01)

(58) Field of Classification Search
CPC ....... G09G 2340/0464; G09G 2380/10; H04N 5/74; H04N 5/64; B60K 35/00; B60K 2370/155; B60K 2370/177; B60K 2370/1529; B02B 2027/0134; B60Y 2400/92
See application file for complete search history.

(56) References Cited

U.S. PATENT DOCUMENTS

| | | | |
|---|---|---|---|
| 2017/0038595 A1 | 2/2017 | Kutomi | |
| 2017/0068338 A1* | 3/2017 | Hatanaka | ................ B60K 37/06 |
| 2017/0274896 A1 | 9/2017 | Yamada et al. | |
| 2019/0333481 A1 | 10/2019 | Hato et al. | |
| 2020/0012103 A1* | 1/2020 | Kasazumi | ................ H04N 5/74 |

* cited by examiner

<ORIENTATION UNCHANGED>

FIG. 7

<ORIENTATION CHANGED>

VIRTUAL IMAGE DISPLAY DEVICE

CROSS REFERENCE TO RELATED APPLICATION

The present application is a continuation application of International Patent Application No. PCT/JP2018/036675 filed on Oct. 1, 2018, which designated the U.S. and claims the benefit of priority from Japanese Patent Application No. 2017-227850 filed on Nov. 28, 2017. The entire disclosures of all of the above applications are incorporated herein by reference.

TECHNICAL FIELD

The present disclosure relates to a virtual image display device to display virtual images.

BACKGROUND

Conventionally, there have been head-up display devices that display virtual images superimposed on the foreground of a vehicle. As one type of such head-up display devices, for example, it is conceivable that a configuration specifies an attitude change of a vehicle and allows a rotation mechanism to change directions of a liquid crystal panel and a backlight, for example. The configuration can specify an ascending slope and a descending slope, for example, based on attitude changes of the vehicle and vertically move positions to display virtual images on the ascending slope and the descending slope. Besides, the head-up display device determines whether the vehicle is traveling a rough road, based on a frequency of the attitude change, for example. The head-up display device inhibits the display of virtual images when it is determined that the vehicle is traveling a rough road.

SUMMARY

According to an example embodiment, a virtual image display device that displays a virtual image by projecting a display light image to a projection area of a vehicle, may include: a low-frequency information acquisition portion that acquires attitude change information of the vehicle at a low-frequency band; a high-frequency information acquisition portion that acquires attitude change information of the vehicle at a high-frequency band; an image renderer that renders image data of the display light image corrected to reduce misalignment attributed to the attitude change at the low-frequency band; a projection optical unit that includes a display surface to display an original image based on the image data, and projects light of the original image as the display light image; and a display controller that displaces the original image to reduce the misalignment of the virtual image attributed to the attitude change at the high-frequency band.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

When the vehicle travels a rough road and causes a high-frequency band attitude change, a conceivable head-up display device interrupts the display of virtual images and stops providing information for occupants. It has been necessary to examine a configuration that continuously provides information by displaying virtual images.

However, the rotation mechanism of the conceivable device aims at reducing virtual image misalignment resulting from low-frequency band attitude changes caused by ascending slopes and descending slopes, for example. Even if a virtual image is continuously displayed during rough road travel, the rotation mechanism can hardly provide an action that allows virtual image display positions to follow high-frequency band attitude changes. As a result, it has been impossible to appropriately correct virtual image display positions and correctly display virtual images superimposedly.

Thus, a virtual image display device is provided to be capable of continuing the correctly superimposed display of virtual images even if a vehicle is subject to a high-frequency band attitude change.

According to a first aspect of the present disclosure, a virtual image display device that displays a virtual image superimposed on a foreground view of a vehicle by projecting a display light image to a projection area defined in the vehicle, the virtual image display device includes: a low-frequency information acquisition portion that acquires attitude change information about an attitude change occurring on the vehicle at a low-frequency band; a high-frequency information acquisition portion that acquires attitude change information about an attitude change occurring on the vehicle at a high-frequency band, the high-frequency band having a higher frequency than the low-frequency band; an image renderer that renders image data of the display light image according to the attitude change information at the low-frequency band, the image data being corrected to reduce misalignment of the virtual image attributed to the attitude change at the low-frequency band; a projection optical unit that includes a display surface to display an original image based on the image data, and projects light of the original image, which is displayed on the display surface, as the display light image onto the projection area; and a display controller that displaces the original image displayed on the display surface based on the attitude change information at the high-frequency band to reduce the misalignment of the virtual image attributed to the attitude change at the high-frequency band.

The above-described virtual image display device previously corrects virtual image misalignment resulting from an attitude change at the low-frequency band occurring on the vehicle at a stage of rendering image data. Meanwhile, the electronic correction process to displace an original image on the display surface reduces virtual image misalignment resulting from an attitude change at the high-frequency band. The electronic correction process makes it easy to follow attitude changes at the high-frequency band. It is possible to effectively reduce the virtual image misalignment. Therefore, the virtual image display device can continue the correctly superimposed display of virtual images even when an attitude change at the high-frequency band occurs on the vehicle.

According to a second aspect of the present disclosure, a virtual image display device that displays a virtual image superimposed on a foreground view of a vehicle by projecting a display light image to a projection area defined in the vehicle, the virtual image display device includes: a high-frequency information acquisition portion that acquires attitude change information about an attitude change occurring on the vehicle at a high-frequency band; an image acquisition portion that acquires image data corrected to reduce misalignment of the virtual image attributed to the attitude change occurring on the vehicle at a low-frequency band, the image data being rendered according to the attitude change information at the low-frequency band having a lower frequency than the high-frequency band; a projection optical unit that includes a display surface to display an original image based on the image data, and projects light of the original image, which is displayed on the display surface, as the display light image onto the projection area; and a display controller that displaces the original image displayed on the display surface based on the attitude change information at the high-frequency band to reduce the misalignment of the virtual image attributed to the attitude change at the high-frequency band.

The above-described virtual image display device previously corrects virtual image misalignment resulting from an attitude change at the low-frequency band occurring on the vehicle at a stage of rendering image data. Meanwhile, the electronic correction process to displace an original image on the display surface reduces virtual image misalignment resulting from an attitude change at the high-frequency band. The electronic correction process makes it easy to follow attitude changes at the high-frequency band. It is possible to effectively reduce the virtual image misalignment. Therefore, the virtual image display device can continue the correctly superimposed display of virtual images even when an attitude change at the high-frequency band occurs on the vehicle.

Embodiments of the present disclosure will be described with reference to the accompanying drawings. The same reference numerals may be used for the mutually corresponding elements in the embodiments to omit a duplicate description. A subsequent embodiment may describe only part of the configuration. In such a case, the other part of the configuration applies to the corresponding part of the configuration described in the preceding embodiment. Combinations of the configurations are not limited to those explicitly described in the embodiments. The configurations of the embodiments may be partially combined, even if not explicitly described, except an invalid combination. The description below will disclose an implicit combination of the embodiments and the configurations described in the modifications.

First Embodiment

Figure 1:
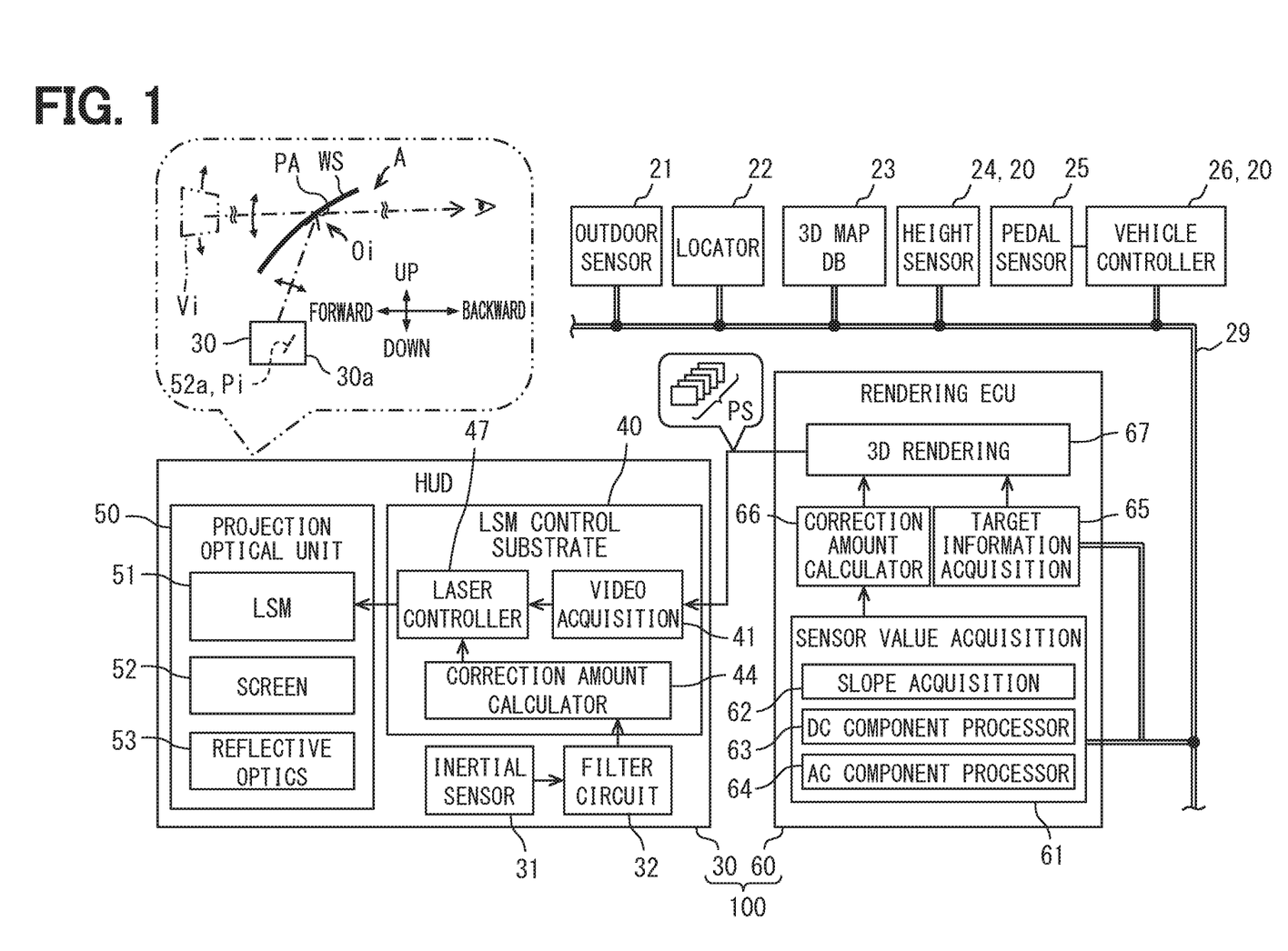
FIG. 1 is a block diagram illustrating an overall onboard system including a virtual image display device according to a first embodiment of the present disclosure.

As illustrated in FIG. 1, a virtual image display device 100 according to a first embodiment of the present disclosure is used for vehicle A. The virtual image display device 100 provides a driver with various information about vehicle A based on AR (Augmented Reality) display using virtual image Vi displayed to be superimposed on the foreground of vehicle A. The virtual image display device 100 can mutually communicate with other onboard configurations via a communication bus 29 for an onboard network. The communication bus 29 electrically connects with an outdoor sensor 21, a locator 22, a 3D map database 23, a height sensor 24, and a vehicle control unit 26, for example, in a direct or indirect manner.

The outdoor sensor 21 detects moving objects such as pedestrians and other vehicles and motionless objects such as curbstones, road signs, road indications, and separation lines on a road. At least part of the moving objects and the motionless objects is used to call attention by superimposedly displaying virtual image Vi. The outdoor sensor 21 includes a camera unit, a lidar, and a millimeter-wave radar, for example. The outdoor sensor 21 successively outputs object information to the communication bus 29. The object information represents relative positions and types of detected moving objects and motionless objects.

The locator 22 can receive positioning signals from a positioning satellite for at least one of satellite positioning systems such as GPS, GLONASS, Galileo, IRNSS, QZSS, and Beidou. The locator 22 measure the location of vehicle A based on the received positioning signal. The locator 22 successively outputs position information about measured vehicle A to the communication bus 29. The locator 22 may include an inertial sensor to correct the position information.

The 3D map database (3D map DB) 23 is mainly comprised of a large-capacity storage medium that stores a large amount of 3D map data. The 3D map data is so accurate as to enable the automatic operation, for example, and contains information representing latitudes, longitudes, and altitudes of roads. The 3D map DB 23 can use the network to update the 3D map data to the most recent information. In response to a request from the virtual image display device 100, the 3D map DB 23 can provide the virtual image display device 100 with 3D map data around and in the traveling direction of vehicle A.

When vehicle A is placed on a road, the height sensor 24 detects vertical displacement occurring on vehicle A to measure the height from the road surface to the body. The height sensor 24 is provided for one of the right and left rear suspensions, for example. The height sensor 24 measures the amount of depression of a specific wheel against the body. The wheel is horizontally displaced due to the operation of a suspension arm suspended from the body. Specifically, the height sensor 24 measures a relative distance between the body and the suspension arm and successively outputs measurement results to the communication bus 29.

The vehicle control unit 26 provides an arithmetic device mainly comprised of a microcontroller. The vehicle control unit 26 controls the behavior of vehicle A based on the object information detected by the outdoor sensor 21 and driving operations of a driver, for example. The vehicle control unit 26 electrically connects with a pedal sensor 25 including an accelerator position sensor and a braking effort sensor. The vehicle control unit 26 controls acceleration in the front-back direction occurring on vehicle A, namely, axle torque and braking force based on detected signals from the pedal sensor 25. Besides, the vehicle control unit 26 provides feedforward control over axle torque and braking force to suppress vibration of vehicle A due to the disturbance such as acceleration or deceleration operation of the driver and unevenness of the road surface. The vehicle control unit 26 successively outputs control information to the communication bus 29. The control information contains target values for the axle torque and the braking force under the feedforward control.

Figure 6:
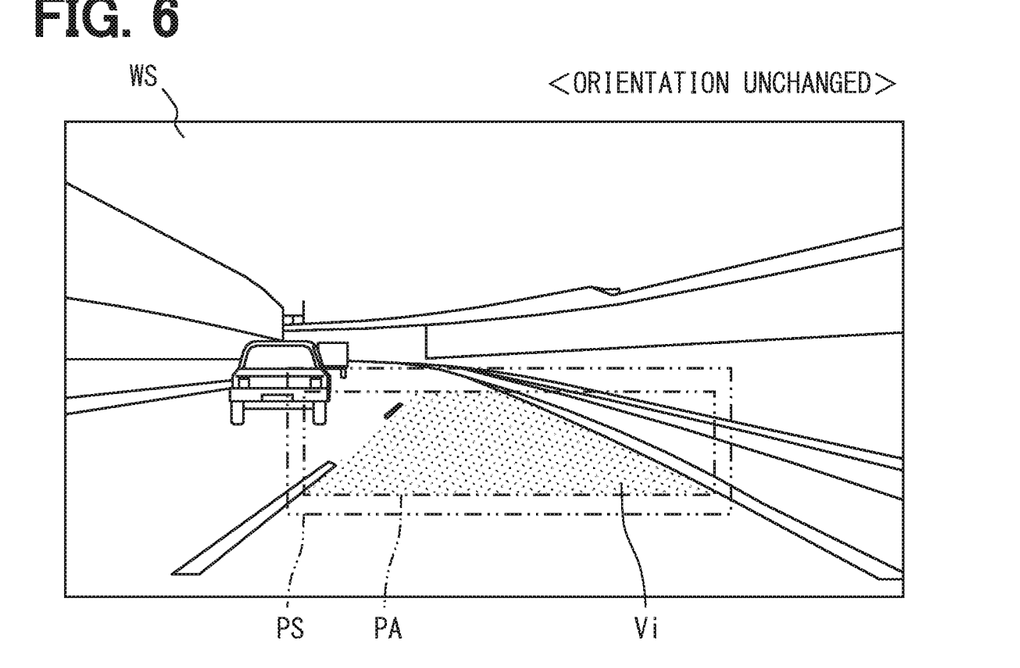
FIG. 6 is a diagram illustrating a virtual image display when no attitude change occurs on a vehicle.

The virtual image display device 100 is mainly comprised of a rendering ECU (Electronic Control Unit) 60 and an HUD (Head-Up Display) 30. The virtual image display device 100 displays virtual image Vi superimposed on a superimposition target in the foreground by projecting display light image Oi onto projection area PA defined on windshield WS of vehicle A. For example, the virtual image display device 100 superimposedly displays virtual image Vi representing the range of a lane being traveled between right and left separation lines in the foreground (see FIG. 6).

Figure 7:
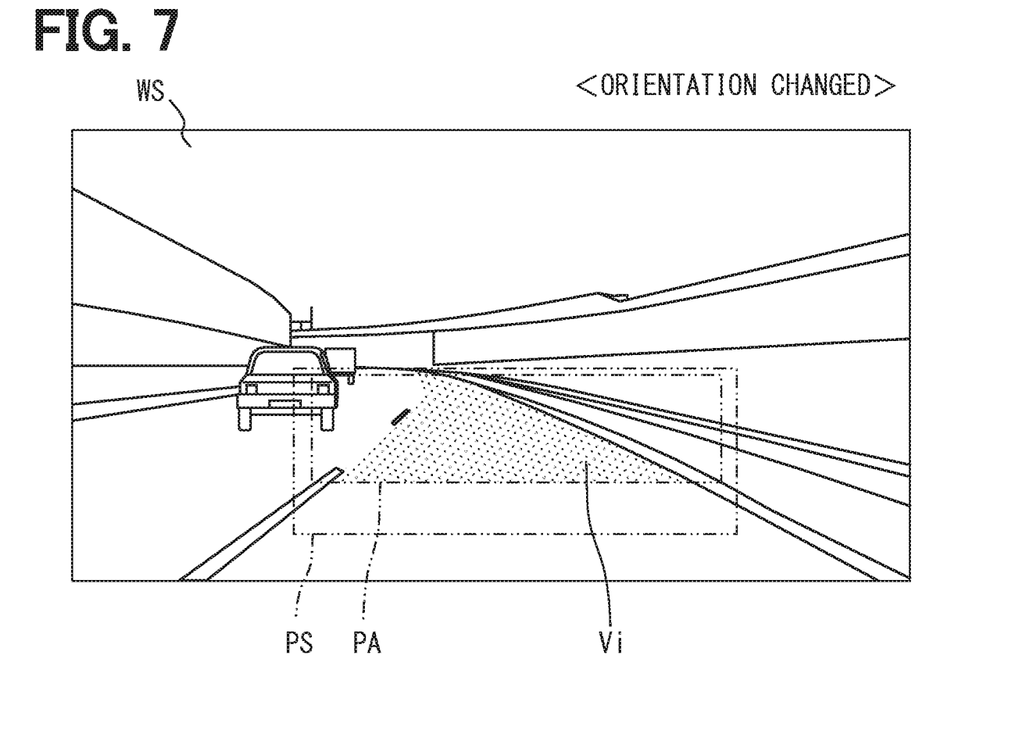
FIG. 7 is a diagram illustrating the effect of a laser control portion to reduce virtual image misalignment.

Besides, the virtual image display device 100 performs display control to maintain the state of superimposing virtual image Vi on the superimposition target from the viewpoint of a driver even if an attitude change occurs on vehicle A (see FIG. 7). In more detail, vehicle A may be subject to attitude changes such as pitch, roll, and heave, changing the positional relationship among the superimposition target, projection area PA, and the driver's eye point. If the projection position of display light image Oi is maintained, virtual image Vi is displayed to be displaced from the superimposition target from the viewpoint of the driver. Therefore, the virtual image display device 100 corrects the projection position of display light image Oi corresponding to the attitude change in vehicle A to reduce the misalignment of virtual image Vi.

Figure 2:
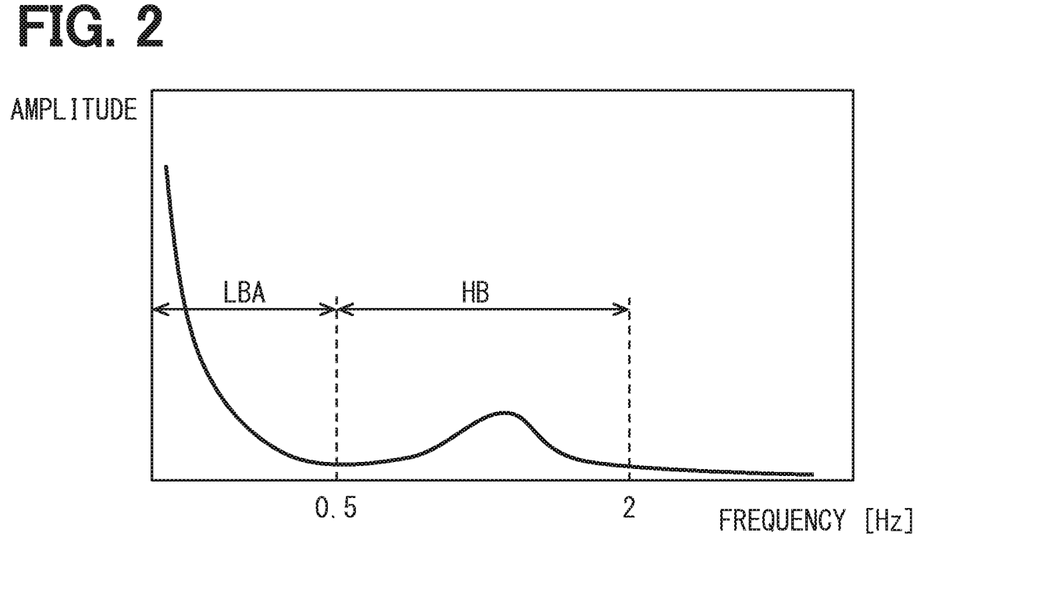
FIG. 2 is a diagram illustrating vibration characteristics of an attitude change occurring on a vehicle and illustrates ranges of a high-frequency band and a low-frequency band.
Figure 3:
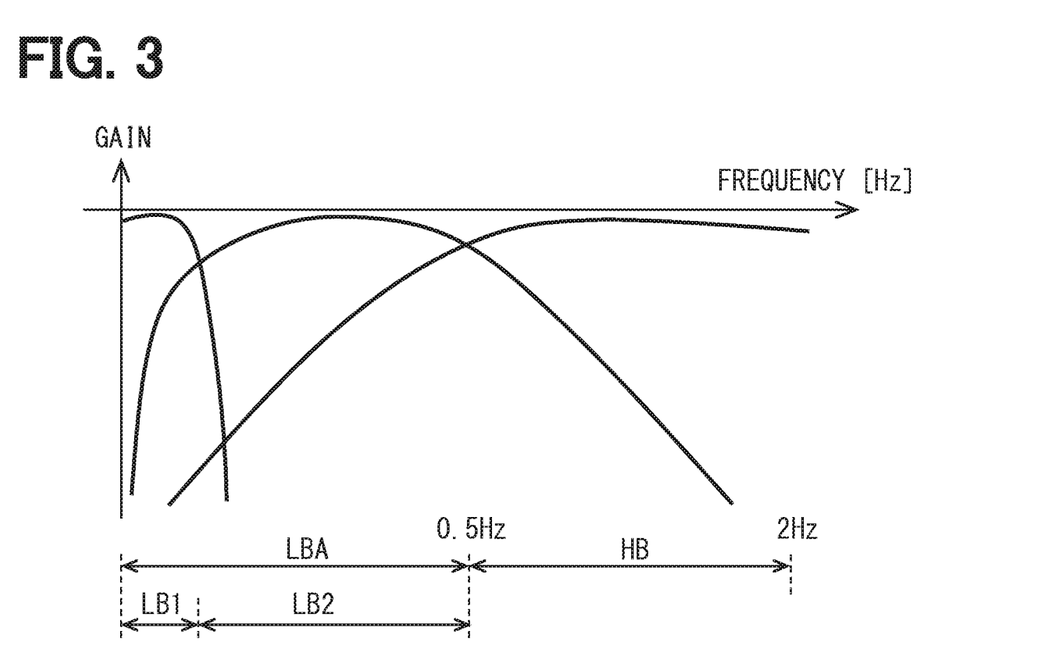
FIG. 3 is a diagram schematically illustrating the correlation between a frequency and gain in terms of a signal whose frequency band is measured.

An attitude change in vehicle A does not vibrate at a constant frequency. As illustrated in FIGS. 2 and 3, the vibration mainly occurs in a frequency band up to approximately 2 Hz, for example. The virtual image display device 100 uses low-frequency band LBA and high-frequency band HB. For descriptive purposes, low-frequency band LBA approximately ranges from 0 to 0.5 Hz. High-frequency band HB is higher than low-frequency band LBA and approximately ranges from 0.5 to 2 Hz. As illustrated in FIGS. 1 through 3, the rendering ECU 60 includes a function to reduce the misalignment of virtual image Vi due to attitude changes based on low-frequency band LBA. The HUD 30 includes a function to reduce the misalignment of virtual image Vi due to attitude changes corresponding to high-frequency band HB. The rendering ECU 60 and the HUD 30 will be described in detail below.

The rendering ECU 60 provides an arithmetic device connected with a plurality of onboard display instruments including the HUD 30. The rendering ECU 60 integratively controls the display of the onboard display instruments. The rendering ECU 60 individually generates video data (i.e., image data) PS for the video displayed by each onboard display instrument and successively outputs video data PS to each onboard display instrument.

The rendering ECU 60 provides an electronic control unit mainly comprised of a computer including a processing portion, RAM, a memory device, and an input/output interface. The processing portion includes at least one of the CPU (Central Processing Unit), GPU (Graphics Processing Unit), and FPGA (Field-Programmable Gate Array), for example.

The memory device stores various programs executed by the processing portion. The programs stored in the memory device include a rendering program to render video data PS and an attitude estimating program to estimate attitude changes in vehicle A, for example. The rendering ECU 60 allows the processing portion to execute the rendering program and the attitude estimating program and thereby provides function blocks such as a sensor value acquisition portion 61, a target information acquisition portion 65, a low-frequency correction amount calculation portion 66, and a 3D rendering portion 67.

The sensor value acquisition portion 61 is communicably connected with the communication bus 29 and is capable of acquiring various information output to the communication bus 29. The sensor value acquisition portion 61 receives output signals from the height sensor 24 and the vehicle control unit 26, namely, the result of measuring a vehicle height and the control information about the axle torque and the braking force. The sensor value acquisition portion 61 processes these output signals as information related to attitude changes corresponding to different bands in low-frequency band LBA. The sensor value acquisition portion 61 acquires attitude change information from these output signals on condition that the attitude change information concerns an attitude change in low-frequency band LBA occurring on vehicle A. There occurs a delay time (communication delay time) until the sensor value acquisition portion 61 acquires output signals from the height sensor 24 and the vehicle control unit 26. The communication delay time conforms to communication standards used for the communication bus 29. For example, an onboard network using CAN (registered trademark) as the communication standard causes the communication delay time of approximately 10 milliseconds.

The sensor value acquisition portion 61 includes sub-function blocks such as a slope acquisition portion 62, a DC component processing portion 63, and an AC component processing portion 64. The slope acquisition portion 62 requests the 3D map DB 23 to provide 3D map data around the current location based on the position information about vehicle A acquired from the locator 22. The slope acquisition portion 62 calculates a road surface slope of the road traveled by vehicle A by using the 3D map data acquired from the 3D map DB 23. The road surface slope provides a value representing the longitudinal gradient of a road. A positive value represents an up slope. A negative value represents a down slope. The slope acquisition portion 62 performs a geometric calculation to acquire the road surface slope of a sloping road by using the information representing a plurality of latitudes, longitudes, and altitudes shown in the 3D map data.

The DC component processing portion 63 and the AC component processing portion 64 correspond to function portions to estimate the attitude change amount (mainly pitch angle) of vehicle A. The DC component processing portion 63 and the AC component processing portion 64 acquire the attitude change information mutually corresponding to different bands in low-frequency band LBA. Specifically, low-frequency band LBA includes first band LB1 corresponding to a lower band of frequencies and second band LB2 corresponding to a higher band of frequencies. In terms of bandwidth, first band LB1 is narrower than second band LB2. An attitude change at first band LB1 occurs due to an increase or decrease in the number of occupants, a change in the load weight, and the substantially constant acceleration and deceleration. An attitude change at second band LB2 occurs due to the acceleration and deceleration resulting from a usual driving operation (pedal operation). For descriptive purposes, the description below depicts an attitude change included in first band LB1 as a DC (Direct Current) component of the vibration and an attitude change included in second band LB2 as an AC (Alternate Current) component of the vibration.

The DC component processing portion 63 uses the results of vehicle height measurement performed by the height sensor 24 to acquire the attitude change information about first band LB1. The DC component processing portion 63 includes a low-pass filter. The low-pass filter allows almost all signals in first band LB1 to pass and attenuates signals in second band LB2 or higher. A cutoff frequency for the low-pass filter is configured to provide a boundary value between first band LB1 and second band LB2.

The DC component processing portion 63 allows the low-pass filter to attenuate a high-frequency noise contained in the measurement result from the height sensor 24 and estimates a vibration component of the attitude change (mainly, a pitch angle change) at first band LB1. According to the above-described process of the DC component processing portion 63, the height sensor 24 is provided as an attitude output portion 20 capable of generating output signals related to attitude changes in first band LB1. The height sensor 24 functions as a sensor to measure DC components of acceleration acting on vehicle A. The high-frequency noise constitutes a vibration component that results from a rough road surface and belongs to second band LB2 or higher described above.

The AC component processing portion 64 uses the control information about the axle torque and the braking force to acquire the attitude change information in second band LB2. The AC component processing portion 64 includes a band-pass filter. The bandpass filter allows almost all signals in second band LB2 to pass and attenuates signals in first band LB1 or lower and signals in high-frequency band HB or higher. A cutoff frequency at the high-frequency side of the bandpass filter is configured to provide a boundary value between low-frequency band LBA and high-frequency band HB. A cutoff frequency at the low-frequency side of the bandpass filter is configured to provide a boundary value between first band LB1 and second band LB2. According to this configuration, the bandpass filter eliminates an overlapping region including signals in first band LB1 detected by the height sensor 24 and signals in high-frequency band HB detected by an inertial sensor 31 to be described.

The AC component processing portion 64 applies the control information about the axle torque and the braking force to the bandpass filter and thereby estimates a vibration component (AC component) attitude change (mainly, a pitch angle) at second band LB2. According to this process of the AC component processing portion 64, the vehicle control unit 26 is provided as the attitude output portion 20 capable of generating output signals related to attitude changes in first band LB1. The vehicle control unit 26 functions as a configuration to identify AC components of acceleration acting on vehicle A.

Similarly to the sensor value acquisition portion 61, the target information acquisition portion 65 is communicably connected with the communication bus 29. The target information acquisition portion 65 acquires the object information output from the outdoor sensor 21 to the communication bus 29 and selects a target superimposed with virtual image Vi from moving objects and motionless objects. The target information acquisition portion 65 provides the 3D rendering portion 67 with a relative position of the selected superimposition target.

As above, the slope acquisition portion 62 acquires the road surface slope. The DC component processing portion 63 acquires the attitude change information in first band LB1. The AC component processing portion 64 acquires the attitude change information in second band LB2. The low-frequency correction amount calculation portion 66 integrates the road surface slope, the attitude change information in first band LB1, and the attitude change information in second band LB2 to specify an attitude of vehicle A. Based on the specified vehicle attitude, the low-frequency correction amount calculation portion 66 calculates a correction amount (low-frequency correction amount) of virtual image Vi due to the attitude change in low-frequency band LBA.

The 3D rendering portion 67 renders video data PS of display light image Oi projected by the HUD 30 onto projection area PA. Rendering object Do (see FIG. 5) corresponding to virtual image Vi is rendered in each frame configuring video data PS. When display light image Oi is projected onto projection area PA, the position and the shape of rendering object Do to be rendered are controlled so that virtual image Vi based on rendering object Do is viewed to have a correct overlap with the superimposition target (see FIGS. 6 and 7).

Specifically, the 3D rendering portion 67 reads setup positions of the predetermined eye point and projection area PA from the memory device, for example. Then, the 3D rendering portion 67 recognizes the relationship among the relative position of the superimposition target supplied from the target information acquisition portion 65 and the setup positions of the predetermined eye point and projection area PA. The 3D rendering portion 67 performs a geometric operation to calculate a projection position of display light image Oi in projection area PA, namely, an image location of virtual image Vi based on rendering object Do, based on the positional relationship among the superimposition target, the eye point, and projection area PA.

The 3D rendering portion 67 acquires the low-frequency correction amount from the low-frequency correction amount calculation portion 66. The attitude change information for low-frequency band LBA is used to generate the low-frequency correction amount. The 3D rendering portion 67 successively corrects a rendering position and a rendering shape of rendering object Do in each frame of video data PS based on the low-frequency correction amount to reduce (cancel) the misalignment of virtual image Vi due to an attitude change at low-frequency band LBA. The 3D rendering portion 67 successively outputs video data PS in a predetermined video format to the HUD 30 on condition that video data PS is already corrected to reduce the misalignment of virtual image Vi.

Figure 4:
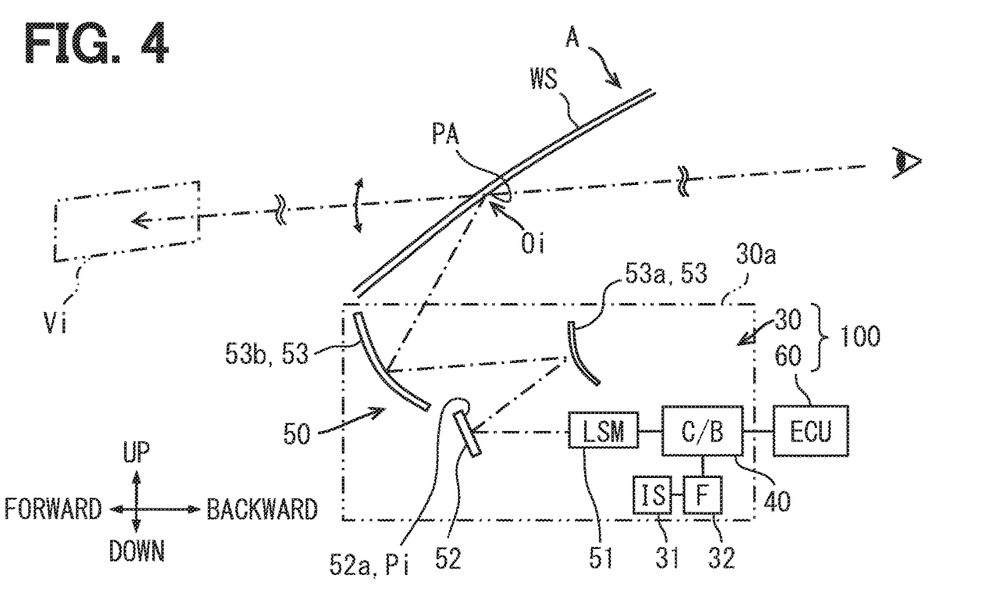
FIG. 4 is a diagram illustrating an HUD configuration.

The HUD 30 as illustrated in FIGS. 1 and 4 represents an onboard display instrument that is placed in the space provided for an instrument panel below windshield WS. The HUD 30 irradiates the light for display light image Oi toward windshield WS. The light reflects off projection area PA and into the eye point to be sensed by a driver. The driver visually recognizes the display containing virtual image Vi superimposed on the superimposition target in the foreground visible through projection area PA. The HUD 30 includes the inertial sensor 31, a filter circuit 32, a projection optical unit 50, and a laser module control substrate (LSM control substrate) 40 to configure the virtual image display.

The inertial sensor 31 represents a measuring portion to measure attitude changes in vehicle A and is provided as a combination of a gyro sensor and an acceleration sensor. The inertial sensor 31 is mounted on vehicle A separately from the height sensor 24 and the vehicle control unit 26. The inertial sensor 31 measures angular velocities in the pitch direction and the roll direction of vehicle A and a vertical acceleration along the yaw axis of vehicle A.

The inertial sensor 31 includes a low-pass filter and an AD conversion portion. The low-pass filter removes high-frequency noise from outputs from the gyro sensor and the acceleration sensor. The AD conversion portion converts an analog signal passing through the low-pass filter into a digital signal. The inertial sensor 31 can transmit signals to the filter circuit 32 based on communication standards such as I2C (Inter-Integrated Circuit, registered trademark) and SPI (Serial Peripheral Interface). The inertial sensor 31 outputs measurement signals in a digital format compliant with the above-described standards to the filter circuit 32.

The filter circuit 32 acquires a measurement signal output from the inertial sensor 31. A delay time (measurement delay time) occurs until the filter circuit 32 acquires the measurement signal. The measurement delay time is shorter than the communication delay time occurring on the communication bus 29. The filter circuit 32 includes at least a high-pass filter and an integration processing portion, for example.

The high-pass filter allows almost all signals in high-frequency band HB to pass and attenuates signals in low-frequency band LBA or lower (see FIG. 3). A cutoff frequency for the high-pass filter is configured to provide a boundary value between high-frequency band HB and low-frequency band LBA. Based on this setting, the high-pass filter attenuates signals in a frequency band that is included in the measurement signal and overlaps with low-frequency band LBA. Besides, the high-pass filter removes a drift component occurring on the gyro sensor of the inertial sensor 31 from the measurement signal after passing through the high-pass filter.

The integration processing portion is mainly comprised of the low-pass filter, for example. The integration processing portion generates a signal indicating a vehicle attitude (such as pitch angle or roll angle) by performing a signal process that applies the time integration to the measurement signal indicating the angular velocity of an attitude change. Some signals pass through the high-pass filter and the integration processing portion in order. The filter circuit 32 acquires these signals as the attitude change information for high-frequency band HB and successively supplies the signals to the LSM control substrate 40.

The projection optical unit 50 is optically configured to project display light image Oi generated from video data PS onto projection area PA. The projection optical unit 50 includes a laser module 51, a screen 52, and a reflective optics 53 including a convex mirror 53a and a concave mirror 53b. These optical components are housed in an enclosure 30a. The enclosure 30a highly accurately regulates the relative positional relationship among the optical components.

The laser module 51 includes a laser light source and a MEMS (Micro Electro Mechanical Systems) scanner, for example. The laser module 51 allows the laser light source to emit the light and the MEMS scanner to scan a mirror portion under control of the LSM control substrate 40. The laser module 51 renders original image Pi on the screen 52 by scanning the laser light irradiated to the screen 52.

The screen 52 is formed into a longitudinal rectangular plate made of a clear and colorless material such as glass. The screen 52 represents a micromirror array, for example. The screen 52 includes a screen reflection surface 52a that reflects the laser light. Many minute reflective convexes are formed by evaporating metal such as aluminum and are two-dimensionally placed on the screen reflection surface 52a. The screen reflection surface 52a displays original image Pi based on video data PS resulting from the scanning by the laser module 51.

The convex mirror 53a and the concave mirror 53b are each provided as a reflecting mirror produced by evaporating metal such as aluminum on the surface of a clear and colorless base material made of synthetic resin or glass, for example. The convex mirror 53a and the concave mirror 53b project original image Pi displayed on the screen 52 onto projection area PA. The convex mirror 53a reflects the laser light reflecting off the screen 52 to the concave mirror 53b. The concave mirror 53b reflects the laser light entering from the convex mirror 53a to projection area PA. Consequently, original image Pi is enlarged to display light image Oi that is projected onto projection area PA. The concave mirror 53b may be provided as a diffractive optical element (DOE) that enlarges original image Pi by diffraction.

The LSM control substrate 40 is electrically configured to control the virtual image display of the projection optical unit 50. A control circuit formed on the LSM control substrate 40 is mainly configured as a microcontroller including a processing portion, RAM, a memory device, and an input/output interface. The LSM control substrate 40 includes a video acquisition portion 41, a high-frequency correction amount calculation portion 44, and a laser control portion 47. These configurations may be provided as function portions embodied by the software such as programs or function portions embodied by the hardware (electric circuits) comprised of a combination of electric elements. The above-described configurations may be provided as function portions embodied by a combination of the software and the hardware.

The video acquisition portion 41 connects with the rendering ECU 60 via a video transmission cable, for example. The 3D rendering portion 67 transmits video data PS for the virtual image display to the video acquisition portion 41. As above, the video acquisition portion 41 acquires video data PS already subject to the correction process that reduces the misalignment of virtual image Vi due to an attitude change at low-frequency band LBA (see FIG. 2, for example).

The high-frequency correction amount calculation portion 44 acquires the attitude change information for high-frequency band HB (see FIGS. 2 and 3) from the filter circuit 32. The high-frequency correction amount calculation portion 44 calculates a correction amount (high-frequency correction amount) of virtual image Vi due to attitude changes corresponding to high-frequency band HB based on the acquired attitude change information for high-frequency band HB.

The laser control portion 47 integrally controls light emission from the laser light source in the laser module 51 and scanning of the MEMS scanner. The laser control portion 47 reproduces images corresponding to the frames of video data PS acquired by the video acquisition portion 41 and renders the images as original image Pi on the screen reflection surface 52a by controlling the laser module 51.

Figure 5:
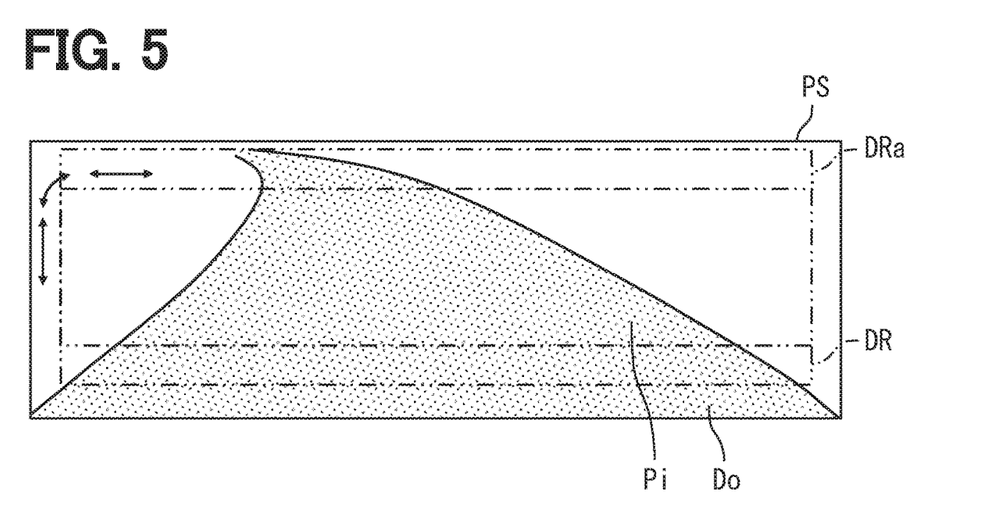
FIG. 5 is a diagram illustrating a correction process performed in the memory of an LSM control substrate.

Original image Pi displayed on the screen reflection surface 52a constitutes part of the images corresponding to the frames configuring video data PS (see FIG. 5). In detail, the image size of video data PS rendered by the 3D rendering portion 67 is larger than the size of an image rendered on the screen reflection surface 52a and the size of display light image Oi projected by the HUD 30. The laser control portion 47 extracts display range DR from each frame image. Display range DR overlaps with projection area PA from the driver's viewpoint. The laser control portion 47 renders original image Pi on the screen reflection surface 52a by using the image data in the extracted display range DR. The above-described image size corresponds to the pixel size of image data and shows the number of vertical and horizontal pixels in the image data.

The laser control portion 47 displaces original image Pi displayed on the screen reflection surface 52a based on the high-frequency correction amount acquired from the high-frequency correction amount calculation portion 44 to reduce (cancel) the misalignment of virtual image Vi due to an attitude change at high-frequency band HB. Specifically, the laser control portion 47 operates the memory storing the output information about the laser irradiation and offsets the laser irradiation timing, namely, the laser irradiation position, in a specific direction corresponding to the high-frequency correction amount. According to this control, the laser control portion 47 can move the apparent position of original image Pi on the screen reflection surface 52a.

In other words, the laser control portion 47 changes a part as display range DR extracted from each frame image when an attitude change occurs in high-frequency band HB. When the acceleration causes a pitch change on vehicle A to depress the rear side, for example, the part extracted from each frame image is changed to display range DRa (see FIG. 5). Display range DRa is rendered as original image Pi on the screen 52 as if original image Pi moved on the screen reflection surface 52a. Since original image Pi moves as above, completely shaped virtual image Vi effectively uses projection area PA and is correctly superimposed on the superimposition target in the foreground (see FIG. 7) even if a change occurs in the range of the foreground overlapping with projection area PA from the driver's viewpoint.

The laser control portion 47 allows original image Pi to move differently depending on the contents of an attitude change occurring vehicle A. When an attitude change such as pitch or heave occurs on vehicle A, for example, the laser control portion 47 slides display range DR to parallel move original image Pi along the screen reflection surface 52a. The projection position of display light image Oi parallel moves along projection area PA. Virtual image Vi follows the apparent movement of the superimposition target. When an attitude change such as roll occurs on vehicle A, for example, the laser control portion 47 tilts display range DR to rotate original image Pi along the screen reflection surface 52a. Display light image Oi is also subject to a tilt to cancel the tilt of vehicle A. Virtual image Vi follows the apparent movement of the superimposition target.

As described hitherto, the virtual image display device 100 according to the first embodiment complementarily combines the height sensor 24, the pedal sensor 25, and the inertial sensor 31, for example, to correct attitude changes (mainly, pitching) at 0 through 2 Hz. Specifically, the virtual image display device 100 previously corrects the misalignment of virtual image Vi resulting from attitude changes at low-frequency band LBA occurring on vehicle A at the stage where the rendering ECU 60 renders video data PS. Meanwhile, the electronic correction process, namely, the displacement of original image Pi on the screen reflection surface 52a reduces the misalignment of virtual image Vi resulting from attitude changes at high-frequency band HB. This electronic correction process makes it easy to follow attitude changes at the high-frequency band. It is possible to effectively reduce the misalignment of virtual image Vi. Therefore, the virtual image display device 100 can continue the correct superimposed display of virtual image Vi even when vehicle A is subject to an attitude change at high-frequency band HB.

The first embodiment does not correct attitude changes at high-frequency band HB at the rendering stage for the 3D rendering portion 67. In other words, the correction is made to attitude changes at high-frequency band HB immediately before virtual image Vi is displayed during the course of the display process from acquiring the information to displaying virtual image Vi. Therefore, the correction of attitude changes at high-frequency band HB is substantially free from a delay due to the calculation of the rendering process in the 3D rendering portion 67. As a result, virtual image Vi can follow the apparent movement of a superimposition target even an attitude change at high-frequency band HB occurs.

The first embodiment corrects attitude changes at low-frequency band LBA at the rendering stage for the 3D rendering portion 67. An attitude change at low-frequency band LBA moves slower but vibrates greater than an attitude change at high-frequency band HB. It is difficult to completely correct attitude changes at low-frequency band LBA simply by sliding or rotating original image Pi for displacement. Besides, an output from the gyro sensor as the inertial sensor 31 inevitably contains drift components. There is a difficulty in a process that generates the attitude change information for low-frequency band LBA from the gyro sensor output.

For the above-described reason, it is unfavorable that the HUD 30 corrects low-frequency band LBA. It is favorable that the 3D rendering portion 67 corrects attitude changes at low-frequency band LBA. When the correction is made to low-frequency band LB at the rendering stage for the 3D rendering portion 67, the virtual image display device 100 can continue the correct superimposed display of virtual image Vi even when vehicle A is subject to an attitude change at low-frequency band LBA.

As above, when the virtual image display device 100 allows the 3D rendering portion 67 to correct low-frequency band LBA and allows an optical correction mechanism 55 to correct high-frequency band HB, the virtual image display device 100 enables virtual image Vi to be continuously superimposed on a superimposition target in traveling vehicle A.

Moreover, the first embodiment provides the HUD 30 with the inertial sensor 31. Therefore, the filter circuit 32 can receive measurement signals from the inertial sensor 31 at a cycle substantially approximate to the real time and acquire the attitude change information for high-frequency band HB without being affected by a communication delay via the communication bus 29, for example. The laser control portion 47 can allow the movement of original image Pi to follow attitude changes at high-frequency band HB without substantial delay. Therefore, the electronic correction provided by the laser control portion 47 can reliably reduce the misalignment of virtual image Vi.

Besides, according to the first embodiment, the filter circuit 32 reduces signals in a frequency band that is contained in measurement signals from the inertial sensor 31 and overlaps with low-frequency band LBA. Therefore, it is possible to avoid a situation where the laser control portion 47 performs the correction that overlaps the correction at the rendering stage of video data PS. The virtual image display device 100 can continue the correct superimposed display of virtual image Vi by allowing the 3D rendering portion 67 and the laser control portion 47 to correctly function so that the 3D rendering portion 67 corrects low-frequency band LBA and the laser control portion 47 corrects high-frequency band HB.

According to the first embodiment, the image size in each frame of video data PS is larger than the image size of original image Pi. Therefore, the size of displayable virtual image Vi is substantially equal to the size without attitude change even when display range DR is changed to shift or rotate original image Pi for displacement. As above, the provision of a margin for video data PS can avoid partially missing display of virtual image Vi.

According to the first embodiment, the measurement delay time between the inertial sensor 31 and the filter circuit 32 is shorter than the communication delay time for the sensor value acquisition portion 61 that uses the communication bus 29 for communication. The correction using the display control from the laser control portion 47 makes it possible to follow attitude changes at high-frequency band HB without substantial delay and reliably reduce the misalignment of virtual image Vi.

According to the first embodiment, low-frequency band LBA is divided into first band LB1 and second band LB2. The sensor value acquisition portion 61 acquires the attitude change information for each of first band LB1 and second band LB2 by using output signals from different information sources. According to this configuration, the rendering ECU 60 can acquire the attitude change information for low-frequency band LBA by using existing sensors and arithmetic devices. There is no need to add an onboard sensor, for example, to measure attitude changes at low-frequency band LBA, making it possible to avoid the complication of the configuration and provide the correctly superimposed display of virtual image Vi.

The first embodiment performs the correction process to parallel move original image Pi when vehicle A is subject to an attitude change such as pitch or heave. The first embodiment performs the correction process to rotate original image Pi when vehicle A is subject to an attitude change such as roll. As above, the movement of original image Pi varies with the contents of an attitude change in vehicle A. It is possible to correct the misalignment of virtual image Vi resulting from the attitude change without arousing uncomfortable feeling in a viewer.

In the first embodiment, the measurement delay time is comparable to "first delay time." The communication delay time is comparable to "second delay time." The height sensor 24 is comparable to a "first output portion." The vehicle control unit 26 is comparable to a "second output portion." The height sensor 24 and the vehicle control unit 26 are comparable to an "attitude output portion." The inertial sensor 31 is comparable to an "attitude measuring portion." The filter circuit 32 is comparable to a "high-frequency information acquisition portion." The laser control portion 47 is comparable to a "display control portion." The screen reflection surface 52a is comparable to a "display surface." The sensor value acquisition portion 61 is comparable to a "low-frequency information acquisition portion." The 3D rendering portion 67 is comparable to a "video rendering portion."

Second Embodiment

Figure 8:
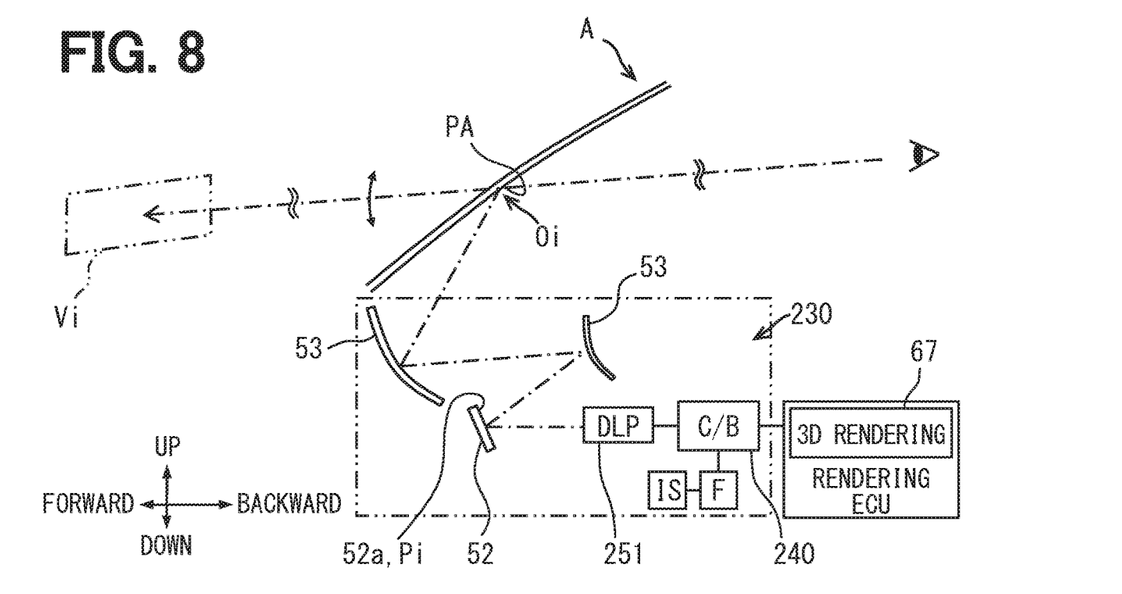
FIG. 8 is a diagram illustrating the virtual image display device according to a second embodiment.
Figure 9:
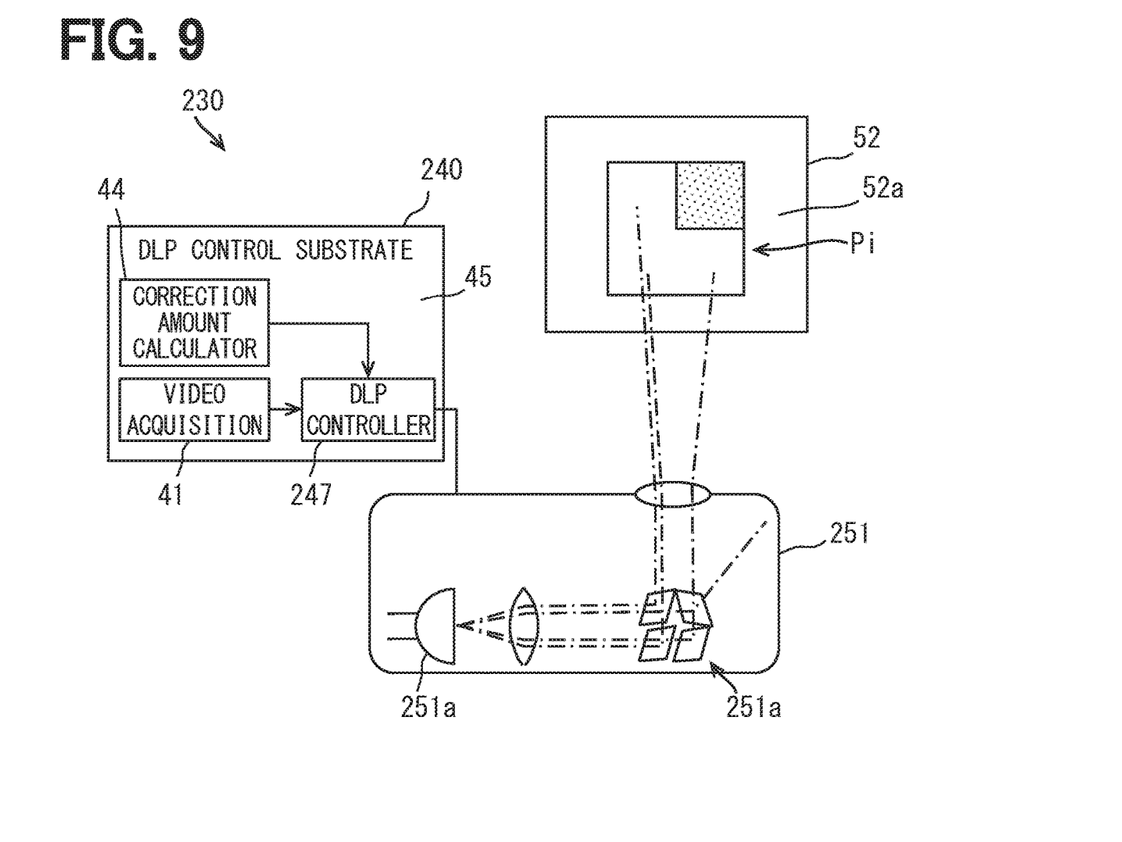
FIG. 9 is a diagram illustrating details of a DLP control substrate and a DLP projector.

A second embodiment as illustrated in FIGS. 8 and 9 is a modification of the first embodiment. An HUD 230 according to the second embodiment includes a DLP (Digital Light Processing, registered trademark) control substrate 240 and a DLP projector 251.

The DLP control substrate 240 corresponds to the LSM control substrate 40 (see FIG. 1) according to the first embodiment. The DLP control substrate 240 includes a DLP control portion 247 in addition to the video acquisition portion 41 and the high-frequency correction amount calculation portion 44 that are substantially equal to the first embodiment. The DLP control portion 247 is electrically connected to the DLP projector 251. The DLP control portion 247 controls the DLP projector 251 to render images.

The DLP projector 251 corresponds to the laser module 51 (see FIG. 1) according to the first embodiment. The DLP projector 251 includes a DMD (Digital Micromirror Device) 251a including many micromirrors and a projection light source 251b that projects the light to the DMD 251a. The DMD 251a and the projection light source 251b are electrically connected to the DLP control portion 247. The DLP control portion 247 integrally controls light scanning of the DMD 251a and light emission of the projection light source 251b. Under control of the DLP control portion 247, the DLP projector 251 renders original image Pi based on video data PS (see FIG. 1) on the screen 52. The reflective optics 53 projects the light from original image Pi displayed on the screen 52 as display light image Oi onto projection area PA.

The DLP control portion 247 operates the memory storing information mainly about on-states and off states of the DMD 251a and offsets on-positions and off-positions of the DMD 251a according to the high-frequency correction amount. This process changes display range DR extracted from each frame image (see FIG. 5) similarly to the laser control portion 47 (see FIG. 1) according to the first embodiment when there occurs an attitude change at high-frequency band HB (see FIG. 2). As a result, original image Pi rendered on the screen reflection surface 52a moves on the screen 52 to cancel the misalignment of virtual image Vi.

The display control performed by the DLP control portion 247 according to the second embodiment provides the same effect as the first embodiment and reduces the misalignment of virtual image Vi resulting from attitude changes at high-frequency band HB (see FIG. 2). Similarly to the first embodiment, the correction is made to attitude changes at low-frequency band LBA (see FIG. 2) at the stage where the 3D rendering portion 67 renders video data PS. Therefore, the correctly superimposed display of virtual image Vi continues even when vehicle A is subject to attitude changes at low-frequency band LBA and high-frequency band HB. In the second embodiment, the DLP control portion 247 is comparable to a "display control portion."

Third Embodiment

Figure 10:
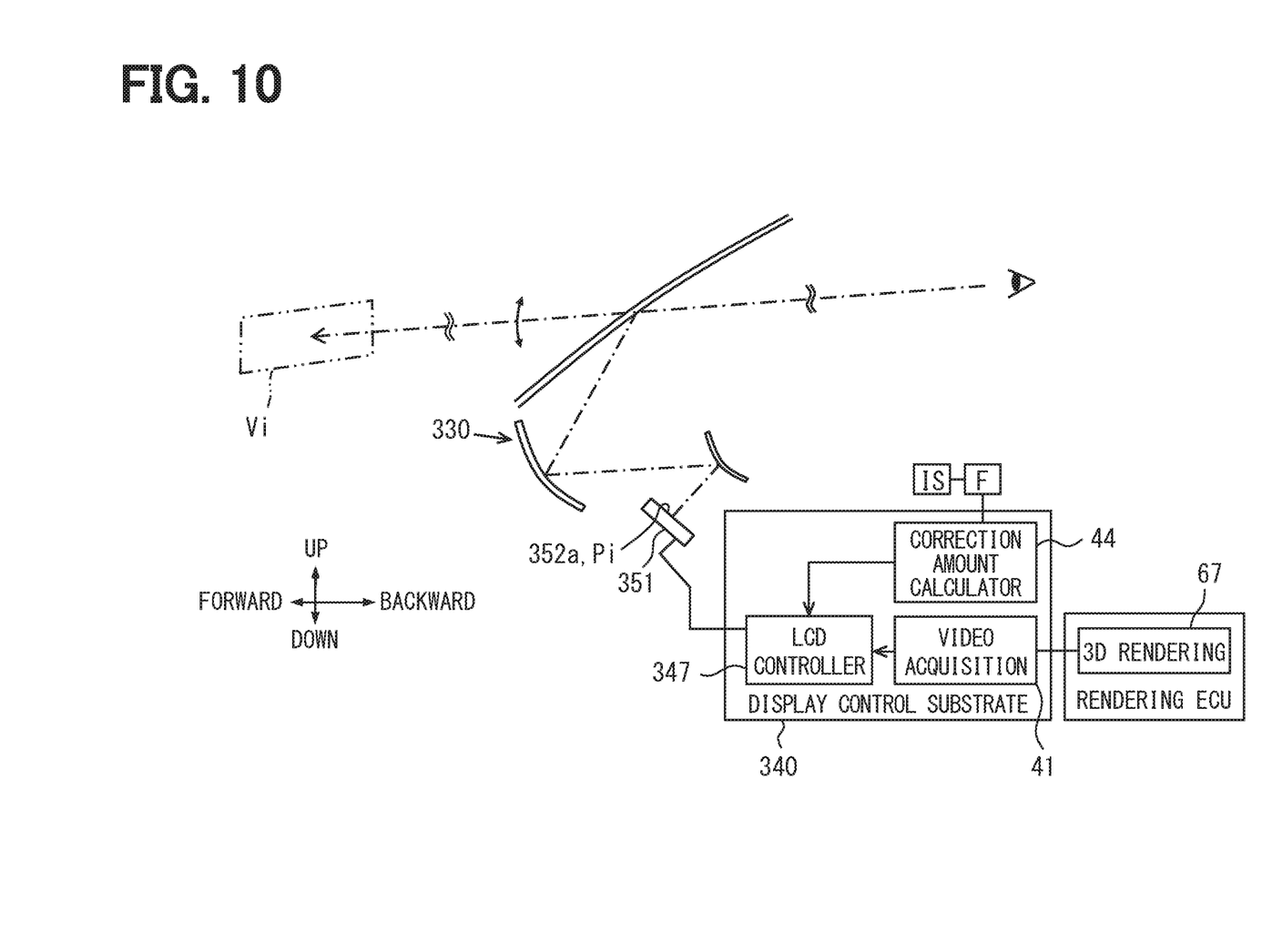
FIG. 10 is a diagram illustrating the virtual image display device according to a third embodiment.

A third embodiment as illustrated in FIG. 10 is another modification of the first embodiment. An HUD 330 according to the third embodiment corresponds to the LSM control substrate 40 and the laser module 51 (see FIG. 1) according to the first embodiment and includes a display control substrate 340 and a liquid crystal display 351.

The display control substrate 340 includes an LCD (Liquid Crystal Display) control portion 347 in addition to the video acquisition portion 41 and the high-frequency correction amount calculation portion 44 that are substantially equal to the first embodiment. The LCD control portion 347 is connected to the liquid crystal display 351. The LCD control portion 347 controls the liquid crystal display 351 to display images.

The liquid crystal display 351 includes a liquid crystal panel and a backlight. The liquid crystal panel includes a plurality of liquid crystal pixels two-dimensionally placed along a display screen 352a. The LCD control portion 347 controls the transmittance of light in each liquid crystal pixel of the liquid crystal panel. The control over the liquid crystal pixels continuously displays original image Pi based on video data PS (see FIG. 1) on the display screen 352a of the liquid crystal panel. The backlight is placed on the rear side of the liquid crystal panel. The backlight transmissively illuminates the liquid crystal panel.

The LCD control portion 347 performs a display process to display the video on the liquid crystal display 351 and thereby offsets the information specifying a voltage (gradation value) applied to each liquid crystal pixel corresponding to the high-frequency correction amount. This software process changes display range DR extracted from each frame image (see FIG. 5) when there occurs an attitude change at high-frequency band HB (see FIG. 2). As a result, original image Pi displayed on the liquid crystal panel moves on the display screen 352a to cancel the misalignment of virtual image Vi.

The display control performed by the DLP control portion 347 according to the third embodiment provides the same effect as the first embodiment and reduces the misalignment of virtual image Vi resulting from attitude changes at high-frequency band HB (see FIG. 2). Besides, the correction is made to attitude changes at low-frequency band LBA (see FIG. 2) at the rendering stage in the 3D rendering portion 67. Therefore, the third embodiment also provides the same effect as the first embodiment and can continue the correctly superimposed display of virtual image Vi. In the third embodiment, the LCD control portion 347 is comparable to a "display control portion." The display screen 352a is comparable to a "display surface."

Fourth Embodiment

Figure 11:
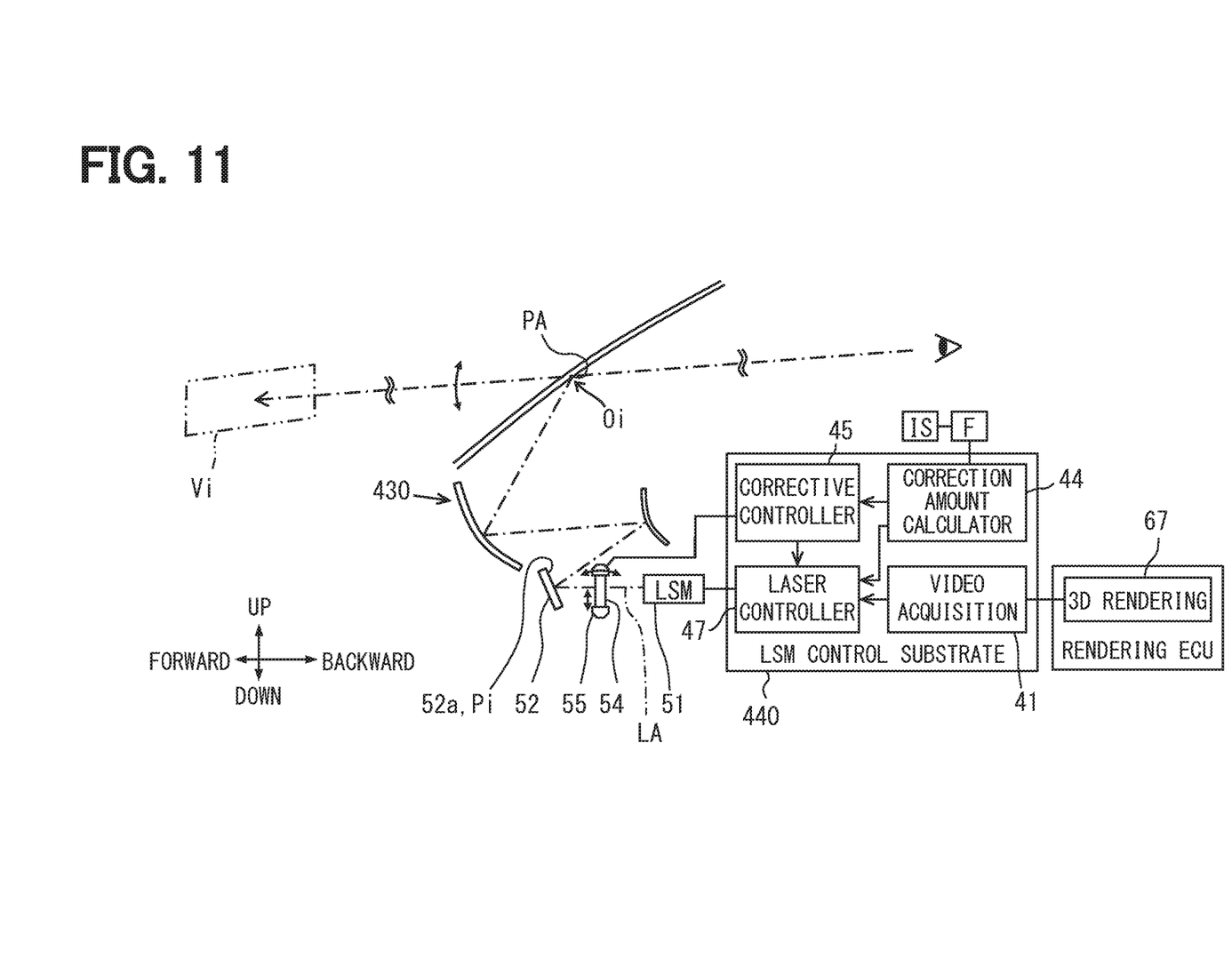
FIG. 11 is a diagram illustrating the virtual image display device according to a fourth embodiment.

A fourth embodiment as illustrated in FIG. 11 is still another modification of the first embodiment. An HUD 430 according to the fourth embodiment includes a corrective optical element 54 and the optical correction mechanism 55. An LSM control substrate 440 according to the fourth embodiment includes a corrective control portion 45 in addition to the video acquisition portion 41, the high-frequency correction amount calculation portion 44, and the laser control portion 47. The HUD 430 can perform not only the electronic correction to offset original image Pi, but also the optical correction using the corrective optical element 54 and the optical correction mechanism 55. The description below explains details of the corrective optical element 54, the optical correction mechanism 55, and the corrective control portion 45 in order.

The corrective optical element 54 is formed as a lens made of a clear and colorless material such as glass. The corrective optical element 54 is supported by the optical correction mechanism 55 and is placed on an optical path between the laser module 51 and the screen 52. The corrective optical element 54 changes the position and the attitude against optical axis LA from the laser module 51 to the screen 52. A change in the position and the attitude of the corrective optical element 54 also changes the projection position of display light image Oi in projection area PA and the image location of virtual image Vi.

The optical correction mechanism 55 includes an electromagnetic actuator mainly comprised of a yoke, a coil, and a magnet. The LSM control substrate 440 controls the operations of the electromagnetic actuator. The optical correction mechanism 55 operates the electromagnetic actuator to change the position and the attitude of the corrective optical element 54. Specifically, the optical correction mechanism 55 can displace (shift) the corrective optical element 54 in a planar direction orthogonal to optical axis LA. Besides, the optical correction mechanism 55 can tilt the attitude of the corrective optical element 54 against optical axis LA.

Similar to the laser control portion 47, the corrective control portion 45 acquires the high-frequency correction amount from the high-frequency correction amount calculation portion 44. The corrective control portion 45 controls the operations of the optical correction mechanism 55 based on the high-frequency correction amount acquired from the high-frequency correction amount calculation portion 44 to reduce (cancel) the misalignment of virtual image Vi resulting from attitude changes at high-frequency band HB (see FIG. 2). The corrective control portion 45 shifts or tilts the corrective optical element 54 to optically displace rendering positions of original image Pi on the screen reflection surface 52a.

The corrective control portion 45 cooperates with the laser control portion 47 to reduce the misalignment of virtual image Vi resulting from attitude changes at high-frequency band HB (FIG. 2). For example, the optical correction mechanism 55 operates to correct the misalignment resulting from attitude changes belonging to the low-frequency side of high-frequency band HB. Meanwhile, the laser control portion 47 controls the display to correct the misalignment resulting from attitude changes belonging to the high-frequency side of high-frequency band HB.

As above, the fourth embodiment combines the electronic correction using the software with the optical correction using the hardware to reduce the misalignment of virtual image Vi resulting from attitude changes at high-frequency band HB. Besides, the correction is made to attitude changes at low-frequency band LBA (see FIG. 2) at the rendering stage of the 3D rendering portion 67. Therefore, the fourth embodiment also provides the same effect as the first embodiment and can continue the correctly superimposed display of virtual image Vi.

Other Embodiments

While there have been described embodiments of the present disclosure, the disclosure should not be understood exclusively in terms of the above-mentioned embodiments but may be applicable to various embodiments and combinations within the spirit and scope of the disclosure.

The above-described fourth embodiment divides the high-frequency band into two bands and performs the optical correction using the optical correction mechanism and the electronic correction using the laser control portion. However, the method of using the optical correction and the electronic correction may be changed as needed. For example, a first modification of the fourth embodiment mainly functions the electronic correction using the laser control portion. The optical correction using the optical correction mechanism supplementarily functions when vehicle A is subject to a large attitude change at the high-frequency band. The first modification can also continue the correctly superimposed display of virtual images.

The configuration of the projector to display the original image is not limited to the above-described embodiments and can be changed as needed. For example, a second modification of the above-described third embodiment provides an EL (Electro Luminescence) panel as a display device comparable to the liquid crystal display. The EL panel can use organic EL and inorganic EL, for example. According to a second modification, an EL control portion comparable to the LCD control portion 347 (see FIG. 10) performs control to offset the original image displayed on the EL panel and moves the original image to cancel the virtual image misalignment. The second modification can also continue the correctly superimposed display of virtual images. It is possible to provide the projector using a display device such as a plasma display, a cathode ray tube, and an LED instead of the liquid crystal display and the EL panel. Besides, it is possible to provide the projector using LCOS (Liquid Crystal On Silicon), for example, instead of LSM and DLP, for example.

According to the above-described embodiments, the cut-off frequencies correspond with each other for the low-pass filter of the DC component processing portion, the bandpass filter of the AC component processing portion, and the high-pass filter of the filter circuit to consecutively configure the frequency bands (see FIG. 3). This configuration complementarily combines a plurality of sensors and enables the control to correct attitude changes at 0 through 2 Hz. However, the first band and the second band of the low-frequency band and the high-frequency band need not be strictly contiguous if the correction process can be performed appropriately. For example, the low-frequency band and the high-frequency band may be slightly separated. Alternatively, the low-frequency band and the high-frequency band may slightly overlap with each other.

The above-described embodiments define the projection area for the projection of display light images to the windshield. However, there may be provided a projection member (such as a combiner) for the projection of display light images separately from the windshield. A virtual image need not be limited to the above-described display object embodying the AR display if the virtual image can be overlapped with the foreground when displayed.

The inertial sensor according to the above-described embodiments is configured as a combination of the gyro sensor and the acceleration sensor. However, the configuration of the inertial sensor can be changed as needed. For example, the inertial sensor may be provided as a 6-axis motion sensor including a 3-axis gyro sensor and a 3-axis acceleration sensor. The 3-axis gyro sensor detects angular velocities in the yaw direction, the pitch direction, and the roll direction. The 3-axis acceleration sensor detects accelerations in the front-back direction, the vertical direction, and the horizontal direction of a vehicle. The inertial sensor may include only either of the gyro sensor and the acceleration sensor.

The inertial sensor may not be built in the HUD if the measurement delay time can be shorter than the communication delay time. The inertial sensor may be mounted on a vehicle as conventionally configured if the inertial sensor is not connected to the communication bus but is directly connected to the filter circuit or the LSM control substrate, for example.

According to the above-described embodiments, the height sensor and the vehicle control unit are comparable to the "attitude output portion." However, the configuration comparable to the "attitude output portion" can be changed as needed. For example, the inertial sensor provided for the locator 22 (see FIG. 1) may be comparable to the "attitude output portion." A MEMS sensor detects vibrations at the low-frequency band and may be directly connected to the rendering ECU, for example. This configuration can substantially eliminate the communication delay time. The "attitude output portion" to supply output signals to the communication bus may not be configured differently from the inertial sensor 31 (see FIG. 1). Measurement signals from the inertial sensor 31 may be directly or indirectly input to the sensor value acquisition portion.

According to the above-described embodiments, the image size of the video data is larger than the image size of original image Pi and the projection size of the display light image. It is favorable to specify the margin of video data to the degree that the margin equals or exceeds the maximum displacement amount of an original image during the correction performed on the HUD. Alternatively, no margin may be applied to video data. The projection size of display light image Oi may be slightly smaller than the image size of original image Pi.

According to the above-described embodiments, the virtual image display device is configured to include the HUD and the rendering ECU. However, when an HUD complies with the above-described embodiments and acquires corrected video data, such an HUD may be comparable to the "virtual image display device." The HUD and the rendering ECU may be provided integrally. Namely, the control circuit of the HUD may include function portions comparable to the sensor value acquisition portion, the target information acquisition portion, the low-frequency correction amount calculation portion, and the 3D rendering portion.

The memory device provided for the rendering ECU and the control substrate can use various non-transitory tangible storage media such as flash memory and hard disks. Besides, a storage medium to store programs related to the virtual image display is not limited to the onboard storage medium according to the configurations but is also available as optical disks and general-purpose computer hard disks used as a source of copy to the storage medium.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A virtual image display device that displays a virtual image superimposed on a foreground view of a vehicle by projecting a display light image to a projection area defined in the vehicle, the virtual image display device comprising:
   a low-frequency information acquisition portion that acquires attitude change information about an attitude change occurring on the vehicle at a low-frequency band;
   a high-frequency information acquisition portion that acquires attitude change information about an attitude change occurring on the vehicle at a high-frequency band, the high-frequency band having a higher frequency than the low-frequency band;
an image renderer that renders image data of the display light image according to the attitude change information at the low-frequency band, the image data being corrected to reduce misalignment of the virtual image attributed to the attitude change at the low-frequency band;
a projection optical unit that includes a display surface to display an original image based on the image data, and projects light of the original image, which is displayed on the display surface, as the display light image onto the projection area; and
a display controller that displaces the original image displayed on the display surface based on the attitude change information at the high-frequency band to reduce the misalignment of the virtual image attributed to the attitude change at the high-frequency band;
wherein:
the low-frequency information acquisition portion acquires an output signal that is output from an attitude output portion and represents the attitude change;
the attitude output portion is mounted on the vehicle independently from an attitude measuring portion;
the attitude output portion includes a first output portion and a second output portion that respectively output signals relating to the attitude change at different bands in the low-frequency band;
the low-frequency information acquisition portion acquires the attitude change information at a first band in the low-frequency band according to a measurement signal from the first output portion;
the low-frequency information acquisition portion acquires the attitude change information at a second band in the low-frequency band according to a measurement signal from the second output portion;
the second band has a higher frequency than the first band;
the measurement signal from the first output portion relates to a height of the vehicle from a height sensor; and
the measurement signal from the second output portion relates to control information of axle torque or braking force.

2. The virtual image display device according to claim 1, wherein:
the attitude measuring portion outputs a measurement signal to the high-frequency information acquisition portion, the measurement signal being acquired by measuring the attitude change on the vehicle.

3. The virtual image display device according to claim 2, wherein:
the high-frequency information acquisition portion acquires the attitude change information at the high-frequency band by attenuating a signal in a frequency band that is included in the measurement signal of the attitude measuring portion and overlaps with the low-frequency band.

4. The virtual image display device according to claim 1, wherein:
a first delay time is defined until the high-frequency information acquisition portion acquires the measurement signal from the attitude measuring portion;
a second delay time is defined until the low-frequency information acquisition portion acquires the output signal from the attitude output portion; and
the first delay time is shorter than the second delay time.

5. The virtual image display device according to claim 1, wherein:
an image size of the image data rendered by the image renderer is larger than an image size of the original image displayed on the display surface.

6. The virtual image display device according to claim 1, wherein:
when the attitude change of a pitch or a heave occurs on the vehicle, the display controller displaces the original image in parallel to the display surface; and
when the attitude change of a roll occurs on the vehicle, the display controller rotates an orientation of the original image along the display surface.

7. A virtual image display device that displays a virtual image superimposed on a foreground view of a vehicle by projecting a display light image to a projection area defined in the vehicle, the virtual image display device comprising:
a low-frequency information acquisition portion that acquires attitude change information about an attitude change occurring on the vehicle at a low-frequency band;
a high-frequency information acquisition portion that acquires attitude change information about an attitude change occurring on the vehicle at a high-frequency band;
an image acquisition portion that acquires image data corrected to reduce misalignment of the virtual image attributed to the attitude change occurring on the vehicle at a low-frequency band, the image data being rendered according to the attitude change information at the low-frequency band having a lower frequency than the high-frequency band;
a projection optical unit that includes a display surface to display an original image based on the image data, and projects light of the original image, which is displayed on the display surface, as the display light image onto the projection area; and
a display controller that displaces the original image displayed on the display surface based on the attitude change information at the high-frequency band to reduce the misalignment of the virtual image attributed to the attitude change at the high-frequency band;
wherein:
the low-frequency information acquisition portion acquires an output signal that is output from an attitude output portion and represents the attitude change;
the attitude output portion is mounted on the vehicle independently from an attitude measuring portion;
the attitude output portion includes a first output portion and a second output portion that respectively output signals relating to the attitude change at different bands in the low-frequency band;
the low-frequency information acquisition portion acquires the attitude change information at a first band in the low-frequency band according to a measurement signal from the first output portion;
the low-frequency information acquisition portion acquires the attitude change information at a second band in the low-frequency band according to a measurement signal from the second output portion;
the second band has a higher frequency than the first band;
the measurement signal from the first output portion relates to a height of the vehicle from a height sensor; and
the measurement signal from the second output portion relates to control information of axle torque or braking force.

8. The virtual image display device according to claim 7, wherein:
the attitude measuring portion outputs a measurement signal to the high-frequency information acquisition portion, the measurement signal being acquired by measuring the attitude change on the vehicle.

9. The virtual image display device according to claim 8, wherein:
the high-frequency information acquisition portion acquires the attitude change information at the high-frequency band by attenuating a signal in a frequency band that is included in the measurement signal of the attitude measuring portion and overlaps with the low-frequency band.

10. The virtual image display device according to claim 7, wherein:
a first delay time is defined until the high-frequency information acquisition portion acquires the measurement signal from the attitude measuring portion;
a second delay time is defined until the low-frequency information acquisition portion acquires the output signal from the attitude output portion; and
the first delay time is shorter than the second delay time.

11. The virtual image display device according to claim 7, wherein:
an image size of the image data rendered is larger than an image size of the original image displayed on the display surface.

12. The virtual image display device according to claim 7, wherein:
when the attitude change of a pitch or a heave occurs on the vehicle, the display controller displaces the original image in parallel to the display surface; and
when the attitude change of a roll occurs on the vehicle, the display controller rotates an orientation of the original image along the display surface.

* * * * *